United States Patent Office 3,536,462
Patented Oct. 27, 1970

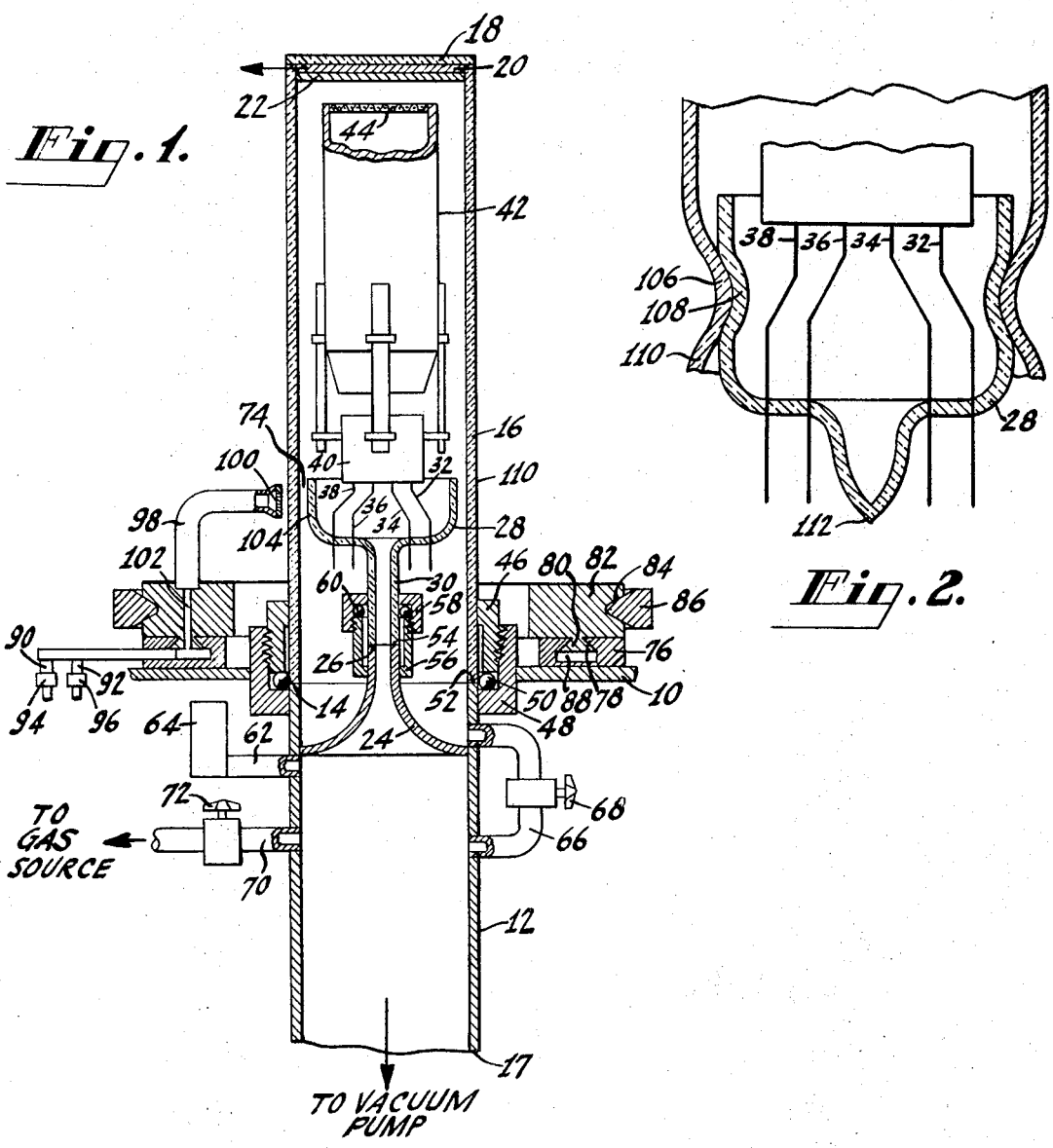

3,536,462
METHOD OF EVACUATING AND SEALING A GLASS ENVELOPE CONTAINING A PHOTOCONDUCTIVE DEVICE
Aden D. Eyster, Lancaster, and John F. Heagy, Leola, Pa., assignors to RCA Corporation, a corporation of Delaware
Filed Dec. 12, 1967, Ser. No. 689,958
Int. Cl. C03b 23/14
U.S. Cl. 65—32                               5 Claims

ABSTRACT OF THE DISCLOSURE

In sealing a glass stem across an open end of a tubular glass envelope of a photoconductive pickup tube, there is provided a cushion of gas within the envelope to prevent compounds released from the heated glass from migrating to a photoconductive target within the tube. The gas may be oxygen at a pressure of from 5 to 20 microns of mercury, or nitrogen or argon at a pressure from 200 microns to 10 millimeters of mercury.

BACKGROUND OF THE INVENTION

Field of the invention

The present invention relates to a method of evacuating and sealing a photoconductive device and particularly to heat sealing a glass stem across an open end of a glass envelope having therein a photoconductive target adversely sensitive to gases released from one or more of the glass parts during sealing.

Description of the prior art

A photoconductive pickup tube such as a vidicon usually comprises a glass envelope having elements therein including a photoconductive target, and an electron gun adapted to produce an electron beam which is caused to scan the target by suitable means.

Among the glasses that are advantageous for service as envelope components of photoconductive pickup tubes are hard borosilicate glasses such as for instance those known by the commercial Corning Glass Code Numbers 7052 and 7056 and marketed by the Corning Glass Works, Corning, N.Y. However, these as well as other glasses release gases when subjected to relatively high temperatures required to fuse the glass for sealing. Such gases may be water vapor, chlorine, carbon dioxide, carbon monoxide, etc. These gases have an adverse effect on a photoconductor if the photoconductor is incorporated in a tube prior to a high temperature sealing step.

While these glasses presently are in relatively wide use for envelope components of photoconductive pickup tubes, such use is made feasible by a technique which does not subject the envelope to high temperature sealing operations after the photoconductor has been incorporated therein. Thus, in such presently widely used photoconductive pickup tubes, a photoconductive layer is formed on a faceplate prior to sealing the faceplate to an envelope, and the faceplate is sealed to the envelope by means of a relatively low temperature sealing material such as indium after all other envelope seals requiring relatively high temperatures have been completed. In such method of sealing, the gases released from the glass components of the device during sealing at relatively high temperatures are expelled from the envelope prior to sealing the faceplate to the envelope. The use of indium as a sealing material permits the seal to be effected at a temperature below that at which the gases are released from the glass, as described in U.S. Pat. No. 2,984,759 to Vine.

In the manufacture of certain other types of photoconductive pickup tubes, however, it is found desirable to seal a glass stem across an open end of an envelope at a relatively high temperature after the faceplate with the photoconductor thereon has been sealed across another opening of the envelope. Photoconductive pickup tubes of this type may be a photoconductor comprising lead monoxide which is harmfully affected by gases released from the glass at the relatively high temperature required for sealing the stem to the envelope when the stem and the envelope are made of a glass such as Corning 7052 or Corning 7056.

SUMMARY OF THE INVENTION

An improved sealing and evacuating method is provided for effecting a relatively high temperature seal in an electron tube while preserving from harm an element previously mounted in the tube.

In accordance with the present disclosure, a cushion of a suitable gas such as oxygen, nitrogen or argon is provided within the tube during the high temperature sealing step for shielding the previously mounted element within the tube from harmful gaseous compounds released by the heated glass. The gas cushion preferably is below atmospheric pressure to preserve desirable characteristics of the element referred to, and for facilitating the sealing operation.

BRIEF DESCRIPTION OF THE DRAWING

FIG. 1 is a sectional view of apparatus that may be used in sealing glass workpieces of a photoconductive tube to form an envelope, and for evacuating the envelope in accordance with the present disclosure, and FIG. 2 is an enlarged fragmentary sectional view of a portion of the completed tube including the seal region thereof, after sealing and evacuation.

DESCRIPTION OF THE PREFERRED EMBODIMENT

In FIG. 1 is shown apparatus with glass workpieces mounted therein, that may be used in practicing the herein-disclosed improved sealing and evacuating method.

A portion of the apparatus that serves the evacuating function comprises a table 10 supporting a tubular metallic structure 12 having an upper en adapted to support a lower end of a tubular glass workpiece 16 as shown in FIG. 1. The lower end 17 of the structure 12 is connected to a vacuum pump, not shown. The upper end of the workpiece 16 is closed by a glass faceplate 18 having on its inner surface an electrically conducting coating 20 made of tin oxide for example, which serves as a signal electrode. Over the conducting coating 20 is a layer 22 of photoconductive material comprising lead monoxide for example.

Fixed to the tubular structure 12 of the apparatus as by brazing is a conical metallic member 24 having an upper end 26 adapted to support a glass stem workpiece 28 by engaging the lower end of a glass exhaust tubulation 30 thereof. Supported by the stem workpiece 28 by means of a plurality of electrical leads, four of which are shown at 32, 34, 36 and 38, is an electrode cage for a photoconductive tube, comprising an electron gun 40 and a focusing electrode 42 having across its upper end, as viewed in FIG. 1, a mesh screen 44.

The outer diameter of the stem structure 28 is slightly smaller than the inner diameter of the tubular workpiece 16 to facilitate sealing and evacuation. The resultant radial spacing between the stem structure 28 and the tubular workpiece 16 may be about 1 mil.

When the tubular workpiece 16 and the stem structure 28 are mounted on the apparatus as shown in FIG. 1, a predetermined desired spacing of about 100 mils is assured between the mesh screen 44 and the photoconductor 22. This spacing is not affected by the evacuating and sealing operations as will become apparent from the following description.

Prior to sealing the stem workpiece 28 across the tubular glass workpiece 16, the region above the conical member 24, as viewed in FIG. 1, is hermetically closed by suitable means such as two annular clamping structures. One clamping structure for closing hermetically the joint between the lower end of the tubular workpiece 16 and the upper end of the tubular portion 12 of the apparatus, as seen in FIG. 1, comprises threadedly engaging members 46, 48. An O ring 50 made of silicone rubber, for example, is disposed between the clamping members 46, 48 and responds in deformation when clamping member 46 is threadedly advanced on clamping member 48. Such deformation hermetically closes the joint 52 between the tubular workpiece 16 and the tubular portion 12 of the apparatus. Clamping member 48 is suitably fixed to the tubular portion 12 of the apparatus as by brazing. The clamping member 46 has a diameter for slidably receiving the tubular workpiece 16.

A similar clamping system is employed for hermetically closing the joint 54 between the exhaust tubulation 30 and the upper end of conical structure 24 of the apparatus. A clamping member 56 is suitably fixed as by brazing to the conical structure 24 and threadedly engages a clamping member 58 adapted to loosely embrace the exhaust tubulation 30. An O ring 60 made of silicone rubber for example, is positioned to be deformed when clamping member 58 is axially advanced upon clamping member 56, for hermetically closing the region of joint 54.

The evacuating portion of the apparatus described also includes a duct 62 affording communication between the interior of the metallic tubular structure 12 and a Pirani gauge 64. The Pirani gauge 64 may be any suitable commercially available vacuum gauge such as one known under the trade name of Edwards "Speedivac." The gauge serves to monitor the pressure within the metallic tubular structure 12 during evacuation. An ionization gauge, not shown, may be used to measure the ultimate pressure of the system. A shunt tube 66 having a hand-operated valve 68 thereacross permits communication when the valve is open between the region within the tubular workpiece 16 above the conical structure 24, as viewed in FIG. 1, and the region within the tubular structure 12 therebelow. The shunt tube 66 expedites evacuation of the tubular workpiece 16. A tube 70 in series with a hand-operated valve 72 is connected between a source of dry gas, not shown, and the interior of the tubular structure 12. The gas may be dry oxygen, nitrogen or argon, for example, having a purpose that will become evident as the present description continues.

It will be apparent from the foregoing that with valve 72 closed and valve 68 open, actuation of a vacuum pump (not shown) to which the lower end of tubular structure 12 is connected, as viewed in FIG. 1, results in evacuation of the space within the tubular workpiece 16 both above and below the glass workpiece 28. Such evacuation not only takes place through the exhaust tubulation 30, but also through the shunt tube 66 when the valve 68 is open. The space within the tubular workpiece 16 both above and below the glass stem 28 is at substantially the same gas pressure because of the annular space 74 between the stem 28 and the inner will of the tubular workpiece 16. This space is preserved until the hereinafter-described sealing portion of the apparatus is actuated.

The sealing portion of the apparatus comprises an annular track 76 suitably fixed to the upper surface of table 10 as shown in FIG. 1, by bracing or bolting. The track includes an annular groove 78 that receives in dovetail fashion an annular flange 80 fixed to a pulley 82. The pulley 82 has a peripheral slot 84 receiving a driving belt 86. The annular groove 78 includes an annular gas duct 88 connected to ducts 90, 92. Duct 90 may be connected through a valve 94 to a source of oxygen and duct 92 may be connected through a valve 96 to a commercial gas supply. Mounted on the pulley 82 is a tubular burner 98 having a tip 100. A passageway 102 extends from the gas duct portion 88 to the burner 98. A motor, not shown, is adapted to drive the belt 86 at a speed related to the periphery of the tubular workpiece 16. Where this tubular workpiece 16 has a diameter of one inch, the speed of rotation of the pulley 82 may be one revolution per minute.

In operation, the space within the tubular workpiece 16 above the conical member 24 is first evacuated to a pressure of about $5 \times 10^{-7}$ torr. Evacuation is then stopped and a dry gas is admitted through valve 72 into the tubular structure 12 of the apparatus from which it migrates to the portion of the interior of the glass workpiece 16 above and below the stem structure 28. When the gas is oxygen, it may be admitted until the pressure within the tubular structure 12 is increased to a value of from 5 microns to 70 microns of mercury. When the gas is nitrogen or argon, it may be admitted to a pressure of a value of from 200 microns to 10 millimeters of mercury. The gas so admitted provides a protective cushion or shield between the sealing region opposite the burner tip 100 and the photoconductive layer 22.

The provision of such cushion of gas is desirable when the tubular workpiece 16 and the stem structure 28 are made of a glass that releases compounds harmful to the photoconductive layer, at sealing temperatures.

The relatively low pressure of the gas cushion serves two useful purposes. It preserves desirable properties in the lead oxide photoconductor and facilitates the sealing operation.

The belt 86 is then actuated to rotate the pulley 82 at a speed of one revolution per minute. A suitable mixture of oxygen and commercial gas to provide a relatively hot sharp flame is admitted to the annular duct 88 by appropriate adjustments of the valves 90, 92. The gas mixture is ignited at the burner tip 100 to provide a flame directed to the outer surface of the tubular glass workpiece 16 at a region thereof opposite a tubular portion 104 of the stem workpiece 28.

During the sealing operation the length of the tubular glass workpiece 16 is maintained constant as a consequence of the limited area of the seal region that is softened at any one time. Thus, the spacing initially fixed between the mesh screen 44 and the photoconductor 22 is preserved.

When the wall of the glass workpiece 16 is softened during sealing, the relatively low pressure within the workpiece causes the glass thereof to move inwardly as shown at 106 in FIG. 2. Such inward movement closes the annular space 74 (FIG. 1) and causes the heat softened glass 106 to contact the glass of the cylindrical portion 104 (FIG. 1) of the glass stem 28. Such contact transfer heat to the glass of cylindrical portion 104 and softens it sufficiently to cause an inward bulge 108 (FIG. 2) therein due to the lower pressure within the glass workpiece 16. The softening of the glass at 108 causes the bulge 106 to diffuse into the glass at region 108 for effectively forming an hermetic seal.

After the seal at regions 106, 108 (FIG. 2) is completed around a full circumference of the workpiece 16 in only one revolution of the pulley 82, the gas mixture fed to burner 98 is modified to form a relatively cool bushy flame at the burner tip 100 (FIG. 1). This is accomplished by reducing the amount of oxygen in the gas mixture. The bushy flame is caused to traverse the seal region in one revolution of the burner 100 during a period of one minute for annealing the seal region.

After completion of the seal, further evacuation of the hermetically closed envelope formed by the glass tube 16 and the stem 18 is effected through the exhaust tubulation 30 (FIG. 1). Since further evacuation of the space below the stem 28 serves no useful purpose, the valve 68 is closed. The skirt region of the tubular workpiece 16 below the seal region is then removed to expose the exhaust tubulation 30. When the pressure within the hermetically closed tube 16 is reduced to an operating pressure of about $10^{-6}$ torr, the exhaust tube 30 is pinched off at 112 (FIG. 2). During the second exhausting step effected through exhaust tubulation 30 only, the gas previously introduced to form a protective cushion for the photoconductor 22, is evacuated.

The lower end portion of the evacuated and sealed photoconductive device is shown in FIG. 2. This end portion may be enclosed in a suitable base (not shown) for protecting the exhaust tubulation tip 112 from fracture.

We claim:
1. Method of heat sealing a glass stem having an exhaust tubulation across one end portion of an elongated glass bulb having a photoconductor in the other end portion harmed by compounds released from the glass of at least one of said glass bulb and glass stem, comprising:
   (a) forming an hermetic closure including said glass bulb,
   (b) reducing the pressure within said hermetic enclosure to a first value below atmospheric pressure,
   (c) admitting a gas into said hermetic enclosure to a pressure of a value above said first value and below atmospheric pressure, for forming a protective cushion adjacent to said photoconductor, for preserving the photoconductive property of said photoconductor,
   (d) heat sealing said glass stem across said one portion of said glass bulb to form an hermetically sealed envelope,
   (e) then evacuating said envelope to an operating pressure for said photoconductor, and
   (f) then hermetically closing said exhaust tubulation.

2. Method according to claim 1 and wherein the glass of at least one of said bulb and stem comprises a hard borosilicate glass.

3. Method according to claim 1 and wherein said gas comprises a gas selected from the group consisting of oxygen, argon and nitrogen.

4. Method according to claim 3 and wherein said gas is oxygen and is admitted to a pressure of from about 5 microns to about 70 microns of mercury.

5. Method according to claim 3 and wherein one of said argon and nitrogen gases is admitted to a pressure of from about 200 microns to about 10 millimeters of mercury.

References Cited

UNITED STATES PATENTS 2,682,009   6/1954   Fraser _____ 65—32

S. LEON BASHORE, Primary Examiner

J. B. HARDAWAY, Assistant Examiner

U.S. Cl. X.R.

65—34, 36, 57, 110, 138, 155, 271; 316—4, 11, 20